United States Patent [19]
Lundquist et al.

[11] Patent Number: 5,483,029
[45] Date of Patent: Jan. 9, 1996

[54] METHOD OF OPERATION OF MOTOR MULTIPLE SWITCHES AND CIRCUITRY

[76] Inventors: Lynn C. Lundquist, 10833 NE. Russell, Portland, Oreg. 97220; John D. Morris, 5800 N. Prinston St., Portland, Oreg. 97203

[21] Appl. No.: 993,127

[22] Filed: Dec. 18, 1992

[51] Int. Cl.$^6$ ...................................................... H01H 9/00
[52] U.S. Cl. ...................... 200/1 R; 200/8 R; 200/16 R; 310/68 R; 310/71
[58] Field of Search ..................................... 200/1 R, 8 R, 200/23–26, 8 A, 11 R, 11 A–11 TW, 16 R, 16 A–16 F; 310/71, 68 R, 68 A, 68 B

[56] References Cited

U.S. PATENT DOCUMENTS

| | | | |
|---|---|---|---|
| 2,307,595 | 1/1943 | Lingal | 200/8 R |
| 2,692,363 | 10/1954 | Moody et al. | 310/68 R X |
| 3,324,259 | 6/1967 | Chamberlin, Jr. et al. | 200/50 A |
| 3,348,003 | 10/1967 | Mrenna | 200/50 A |
| 3,471,658 | 10/1969 | Elliott | 200/8 R |
| 3,780,245 | 12/1973 | Beddow | 200/564 |
| 3,970,808 | 7/1976 | Gryctko et al. | 200/50 A |
| 4,017,698 | 4/1977 | Kuhn et al. | 200/50 AA |
| 4,020,301 | 4/1977 | Ericson et al. | 200/50 AA |
| 4,160,885 | 7/1979 | Ellicott et al. | 200/1 R |
| 4,572,930 | 2/1986 | Kakuta et al. | 200/5 R |
| 4,914,262 | 4/1990 | Appleton | 200/8 R |
| 5,061,833 | 10/1991 | Hodder et al. | 200/255 |

Primary Examiner—J. R. Scott
Attorney, Agent, or Firm—Lynn Lundquist

[57] ABSTRACT

A method for combining the operation of the electrical disconnecting safety switch of an electric motor within the motor's electrical terminal housing. This method of operation results in a single, compact housing directly mounted to the electric motor body which is used for both the safety disconnect function as well as the termination point for the incoming power leads and the motor wire taps. This method of operation may be employed for single phase and three phase alternating current motors as well as commonly wired direct current motors. The method further provides for a simple and economical way of mounting the device to a variety of motor frames with the use of appropriate adapter plates. The incorporated motor safety disconnect function is available in either of two configurations. The disconnect function may be operated as a rotary tumbler switch with an external rotary hand operator which allows a fully weatherproof design. The disconnect function may also be operated as a draw-out, or plug type, disconnecting switch which allows more economical manufacture.

21 Claims, 6 Drawing Sheets

METHOD OF OPERATION OF MOTOR MULTIPLE SWITCHES AND CIRCUITRY

BACKGROUND-FIELD OF THE INVENTION

This apparatus and method provides an electrical disconnecting switch which is integrally incorporated into the motor terminal housing.

The *National Electrical Code* (NEC) as published by the National Fire Protection Association requires that "A [motor] disconnecting means shall be located in sight from the motor location and the driven machinery location." (NEC 430-102 (b). Thus, a mechanical means is required which can be used to electrically disconnect the machinery motor from the incoming electrical power lines, and must be located within a specified proximity to the motor and equipment which it disconnects.

This invention has incorporated a disconnecting switch of a type acceptable to the *National Electrical Code* into a housing which is adjacently affixed to the motor and which also serves as the required motor terminal housing wherein the incoming power lines are electrically connected to the electrical windings of the motor.

BACKGROUND-DESCRIPTION OF THE PRIOR ART

Within the present art, electrical isolation of motors is generally achieved in one of two methods. In the first case, an electrical disconnect device is located within sight of the motor. Subsequently, the incoming electrical power lines to the motor are passed through, and may be de-energized by, the disconnect device.

In a second case, the disconnect device is distant from the motor location and may be incorporated into a motor control center. Provision is made within this remote location to de-energize the motor's incoming electrical power lines by means of a disconnecting device which can be locked in an open (de-energized) position.

In either case, the objective of the disconnecting device is to provide both protection to personnel and equipment during routine maintenance and ready access to a disconnecting means in the event of an emergency.

When properly installed according to the requirements of the *National Electrical Code*, the installation of a disconnecting device adjacent to the motor equipment being protected or in a motor control center provides the minimal required personnel and equipment protection. It has the disadvantage, however, of requiring an additional electrical device within the incoming electrical power lines servicing the motor. Further, it may be located such that it is not convenient for maintenance personnel to manipulate or verify during service.

The technology of the method presented herein is a significant advance over the prior art in that it has incorporated the function of the electrical disconnecting device and the motor terminal housing into a single device integral to the electric motor. The ensuing advantages of a disconnecting means which is integral to the motor it is protecting is in the added safety of the disconnecting means immediately adjacent to the motor. In addition to safety advantages, economic advantages are gained by reducing the complexity of the electrical installation.

OBJECTIVES OF THE INVENTION

This method was developed with an understanding of the limitations of the present methodology employed in the electrical disconnecting means for an electric motor installation and, further, with a view to the requirements and intent of the *National Electrical Code*.

1. It is the general objective of this method to provide a disconnecting means mounted directly to the electric motor which is served by the disconnecting means.

2. Another objective of this method is to integrate the disconnecting means and the motor terminal housing into a single enclosure.

3. Another objective of this method is to incorporate a means of disconnecting all incoming electrical power lines to the motor simultaneously with a single operator motion.

4. Another objective of this method is to provide a means for de-energizing the motor control circuit simultaneously and from the same location as the motor disconnect device. (The term simultaneously does not preclude the intended function of a control circuit break prior to the disconnection of the service leads.)

5. Another objective of this method is to provide a disconnecting device which will accommodate typical dual voltage and wye or delta wound alternating current motors.

6. Another objective of this method is to provide a disconnecting means for direct current motors.

7. Another objective of this method is to provide multiple embodiments of the disconnecting means.

8. A final objective of this method is to provide a universal disconnecting apparatus which can be adapted to individual manufacturers' motors by means of an adapter plate.

These and other objectives and advantages of the present method, and the manner in which they are achieved, will become apparent in the following specifications and claims.

SUMMARY OF THE INVENTION

The present apparatus and method provides an electrical disconnecting switch which is integrally incorporated into the motor terminal housing. The terminal housing performs a first function of an electrical termination point for the incoming power lines with the motor leads, as well as the junction box where motor lead taps are connected for the appropriate voltage utilization of the motor. Additionally, this apparatus provides a second function of a disconnecting means for de-energizing the motor while locking the disconnect in the de-energized state.

Two embodiments are employed to achieve the disconnecting function. In the preferred embodiment, a rotary tumbler arrangement is located between a series of line connection lugs and the terminal lugs leading to the motor. As the tumbler is rotated, the conducting elements selectively open or close the line connections to the motor. Additionally, an auxiliary contact is provided which disconnects the motor controller. As will be seen within the body of this disclosure, the number of line poles may be modified for single or three phase alternating current applications or further, the apparatus may be employed as a direct current motor disconnect device.

In a second embodiment, the device consists of a draw-out arrangement which opens the line leads to the motor. This embodiment is generally intended as a less expensive application of the concept. As in the case of the rotary embodiment, auxiliary contacts may be employed to de-energize the motor controller. The number of poles is also determined by the application.

This method and device further addresses the design of a motor adaptor plate which will mate the universal device to a given motor manufacturer's motor frame.

Significant advantages ensue from this combined disconnect and terminal housing arrangement. From the standpoint of safety and convenience, this device is directly attached to the motor for which protection is required. Safety and convenience are greatly enhanced because of the immediate proximity of the disconnect and the protected equipment.

Additional advantages are apparent in the reduced cost for a motor driven installation. The total cost of labor and materials for a single device on the motor is less than the installed cost of separately located disconnecting devices and their necessary conduit installations.

DESCRIPTION OF THE PREFERRED EMBODIMENTS

Figure 1:
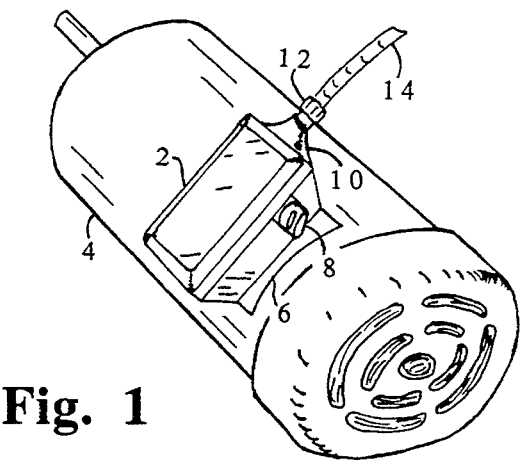
FIG. 1 is a perspective view of the disconnecting device mounted on an electric motor.

To simplify the description, symmetrical parts, or portions of a single part where divided by a sectional view, will be designated with a prime ('). The description of the part(s) having primed reference characters will be limited. Further, to avoid unnecessary detail in both the drawings and specifications, the identification and explanation of construction details which would normally be required for the finished product are omitted if they do not contribute to the understanding of the unique qualities of this device.

Referring now to FIG. 1, the motor mounted disconnecting device 2 is shown affixed to a typical electric motor 4. By means of an adapter plate 6, a universal motor mounted disconnecting device 2 is readily adapted to each manufacturer's motor 4 in place of the supplied terminal housing. The device has an easily accessible hand operator 8 mounted on the right hand side. The disconnecting device 2 is supplied with a threaded connector boss 10 to which a conduit coupling 12 is connected, and subsequently, the conduit 14 for the electrical connection of the motor 4 to the power source.

Figure 2A:
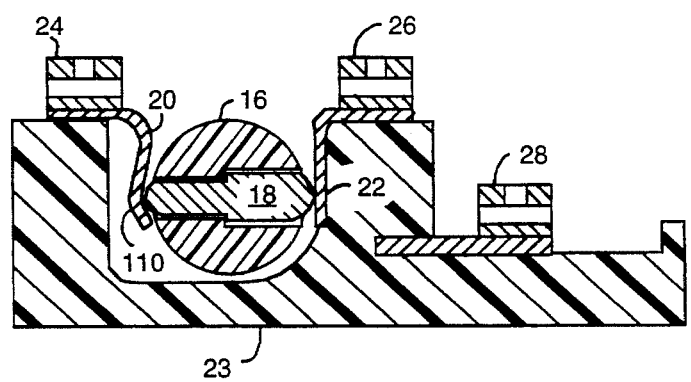
FIG. 2a is a sectional view of closed tumbler contacts at 2—2 of FIG. 4.

FIG. 2a shows the preferred embodiment which employs a tumbler 16 constructed of an insulating material. A contact pin 18 passes through the tumbler 16 in such a manner that simultaneous electrical contact is made with a resilient line terminal member 20 and a rigid motor terminal member 22 when the device is in the energized position. Each phase or electrical conductor is controlled by a single contact pin 18.

To establish a completed electrical circuit, an incoming conductor is terminated on the line lug 24 which is In electrical contact with the line terminal member 20. Similarly, a terminal lug 26 is in electrical contact with the rigid terminal member 22 so that the electrical circuit is completed between the corresponding line lug 24 and terminal lug 26. (The line lugs 24 and 24' are identified in subsequent figures by preferred electrical nomenclature as L1, L2, and L3. The terminal lugs 26 and 26' are similarly identified as T1, T2, and T3.)

Also shown in FIG. 2a is a motor terminal lug 28. Though not essential to the operation of the disconnecting device, the terminal lug 28 is conveniently used to terminate motor wires for selected voltage applications.

Figure 2B:
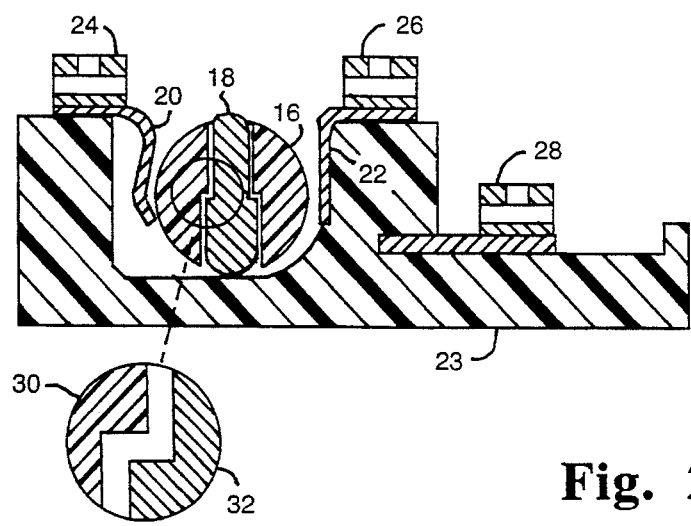
FIG. 2b is a sectional view of open tumbler contacts at 2—2 of FIG. 4.

FIG. 2b is similar to FIG. 2a with the exception that the tumbler 16 has been rotated to the de-energized position wherein the contact pin 18 is electrically isolated from both the line terminal member 20 and the rigid motor terminal member 22.

FIG. 2b amplifies the detail of a tumbler internal shoulder 30 which interferes with a contact pin shoulder 32, thus preventing the contact pin 18 from dislodging from the tumbler 16. The contact pin 18 "floats" in the tumbler 18 body which allows unrestricted contact between conductive members.

Figure 3:
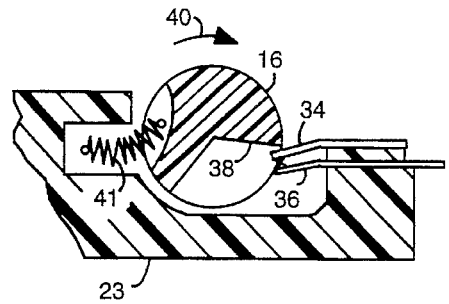
FIG. 3 is a sectional view of closed auxiliary contacts at 3—3 of FIG. 4.

FIG. 3 shows the detail of the auxiliary contacts. A moving auxiliary contact 34 is moved into electrical contact with a stationary contact 36 by the cam portion 38 of the tumbler 16 at cross section 3—3 of FIG. 4. The auxiliary contacts 34 and 36 are brought into electrical contact by the cam portion 38 of the tumbler 16 when the tumbler is rotated to the energized position as indicated by arrow 40.

FIG. 3 also shows a toggle spring 41 which causes the tumbler 16 to snap to either the open or closed position.

Figure 4:
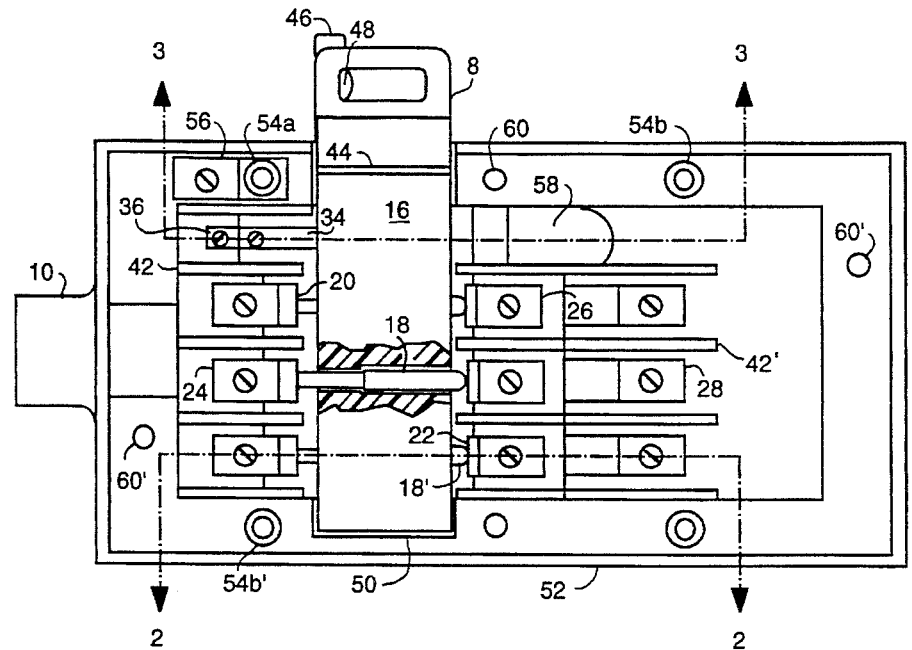
FIG. 4 is a plan view of the contact portion of the device.

FIG. 4 is a plan view of the preferred embodiment showing the relationship of each of the functioning elements. The tumbler 16 is shown in the energized position where the contact pins 18 are making contact with the line terminal member 20 and the motor terminal member 22 which are in electrical contact respectively with the line lugs 24 and the terminal lugs 26. (To avoid drawing complexity, not all items are designated with legend numbers when the detail is identical to an identified detail.) The terminal portions of the moving auxiliary contact 34 and the stationary auxiliary contact 36 are also shown. The bare metal parts of each phase is separated by an insulating partition 42.

In this view, more complete detail is shown of the tumbler 16, including an "O" ring groove 44 used to provide a NEMA 4 (rain tight) construction of the case. The tumbler 16 has a hand operator 8, which is used to manipulate the tumbler assembly. Additionally, there is provision for locking the tumbler 16 in the de-energized position by sliding the thumb tab 46 which opens a lockout slot 48 and locks the tumbler assembly in the de-energized position (as will be shown in FIG. 5). The tumbler assembly fits into a depression at 50 which physically holds the assembly in location without requiring an opening in the disconnecting device body 52 which would compromise rain tight construction.

The disconnecting device body 52 is secured to the adapter plate 6 by mounting fasteners 54. Three mounting fasteners 54b merely secure the device body 52 to the adapter plate; mounting fastener 54a additionally provides the conductive means between the ground lug 56 and the metal portions of the motor. A hollowed portion of the device body provides a wire channel 58 for the motor leads. A threaded connector boss 10 is provided adjacent to the line lugs 24 which will accommodate a threaded conduit coupling 12. Cover mounting threaded holes 60 are also provided.

Figure 5:
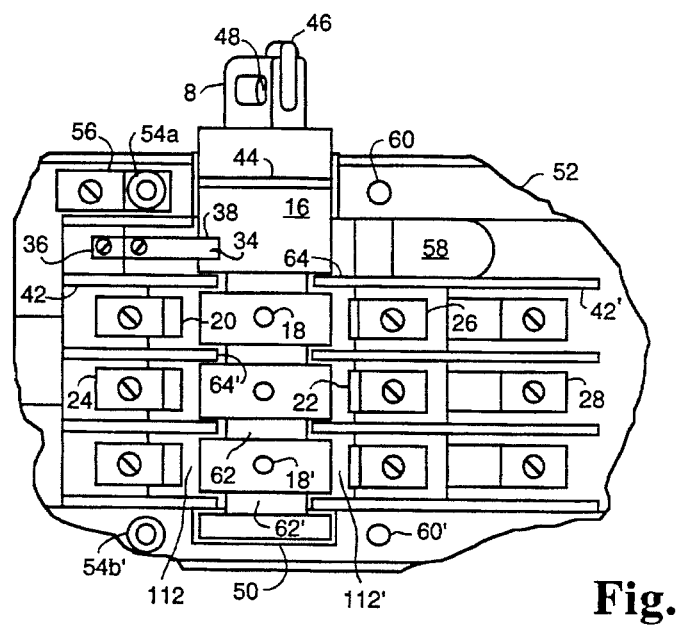
FIG. 5 is a partial plan view of the contact portion of the device showing an arc shielding configuration.

FIG. 5 shows another embodiment wherein the tumbler 16 has annular grooves 62 which increase the linear distance between contact pins 18. This increased linear distance, in conjunction with the portion of the insulating partition projection 64 which extends into the annular groove 62 provides arc suppression when the contacts are opened under load. This figure also shows the cam portion 38 of the tumbler 16 as seen in this view when the tumbler 16 is rotated to the open position.

Figure 6:
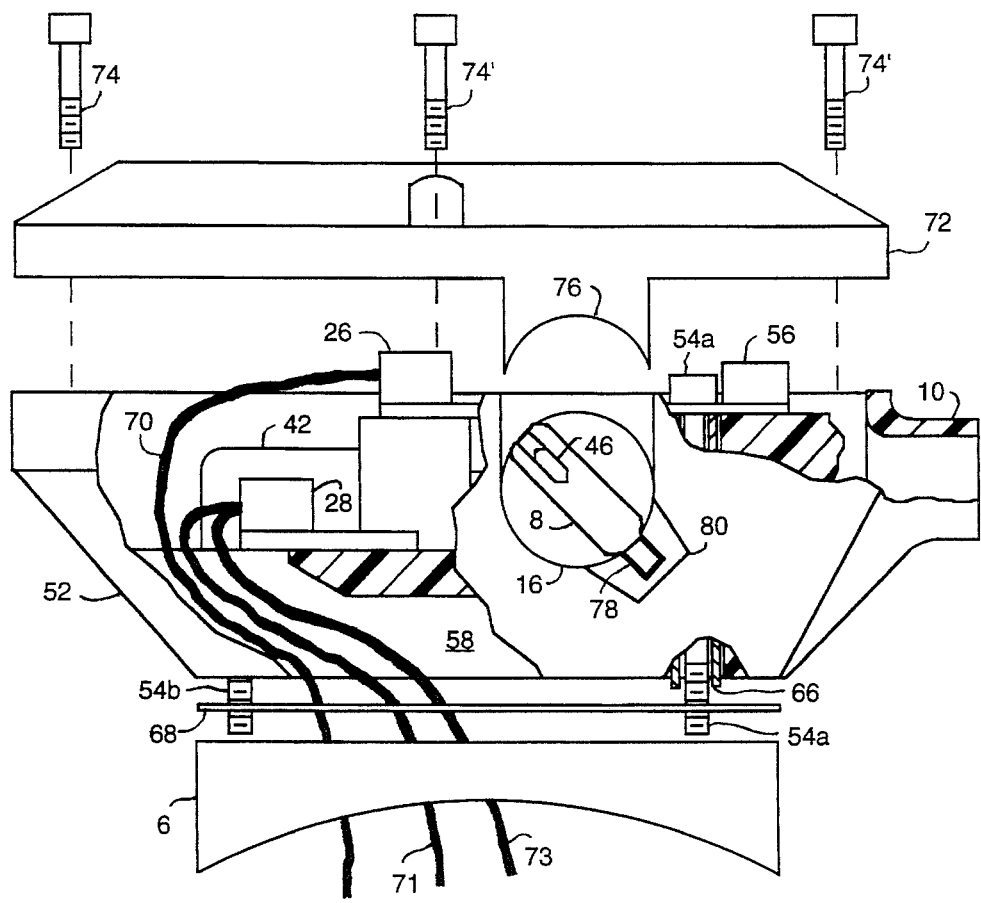
FIG. 6 is a elevation and partial sectional view of the device.

FIG. 6 shows the detail of an elevation view of the preferred embodiment. The disconnecting device body 52 is secured to a motor adaptor plate 6 by the mounting fasteners 54. The grounding mounting fastener 54a is in electrical contact with the ground lug 56 and the metal motor adapter plate 6. To further enhance electrical conductivity, a grounding sleeve 66 is mounted in compression which directly bears against the ground lug 56 and the adaptor plate 6. It should be noted that the adaptor plate gasket 68 is so constructed that it provides clearance In the area of the grounding sleeve 66, so that the grounding sleeve 66 is in direct electrical contact with the conductive adapter plate 6.

The provision for the motor leads is shown in this view. The wire channel 58 is shown as a cavity wherein the motor lead wires 70 are threaded from the motor proper, through the adapter plate 6 and subsequently to the motor terminal lugs 26. Additionally, motor terminal lugs 28 are used to connect internal motor tap connections 71 and 73.

The body cover 72 and cover fasteners 74 are shown in this view. An extended portion 76 of the cover is shown which forms a weatherproof seal around the tumbler 16 and with the device body 52. The tumbler 16 is show in the locked position with the thumb tab 46 depressed which extends the locking tab 78 into a notch formed into the lock seat 80 molded into the device body 52.

Figure 7A:
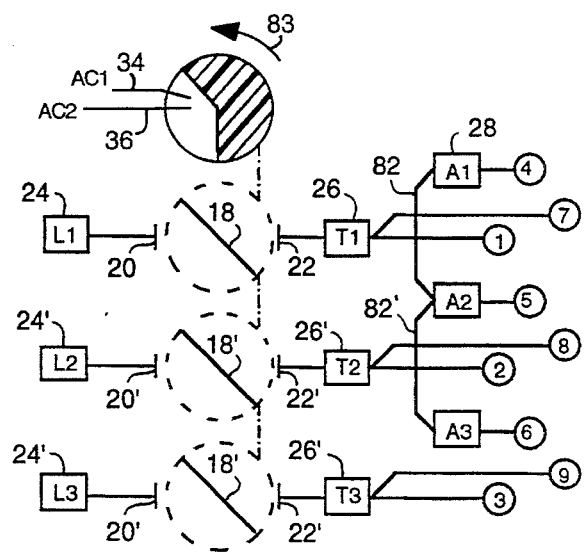
FIG. 7a is a schematic representation of the device wired for a low voltage, wye connected three phase alternating current motor.

FIG. 7a shows the schematic for the device In the de-energized position when it is used for a low voltage, wye connected three phase motor, in this application, the motor terminal lugs 28 are made common with a jumper 82 and serve as a termination point for the motor wire numbers conventionally designated as 4, 5, and, 6. Motor wire number 7 is terminated with wire number 1 at the terminal lug 26 T1. Similarly, wires number 8 and 2, and wires number 9 and 3 are terminated respectively under terminal lugs 26 T2 and T3. When the tumbler 16 is rotated in the direction of arrow 83 the auxiliary contacts 34 and 36 are closed, followed by the completion of the circuits by the contact pins 18 between the respective line terminal members 20 and motor terminal members 22.

Figure 7B:
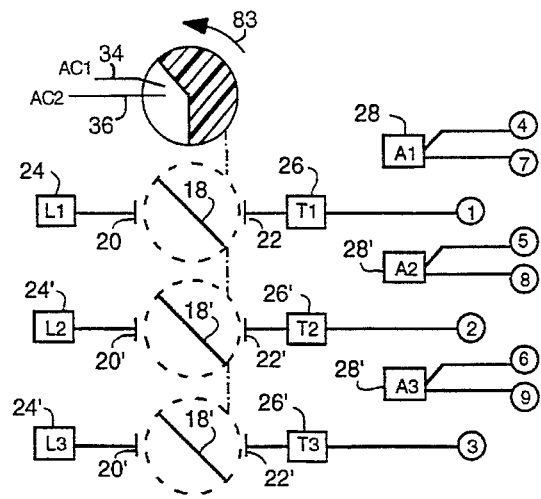
FIG. 7b is a schematic representation of the device wired for a high voltage, wye connected three phase alternating current motor.

FIG. 7b is the schematic for a high voltage wye connected motor where the motor terminal lugs are used to connect internal motor connections without a jumper. The manner of electrical contact function is identical to that described in FIG. 6a.

Figure 7C:
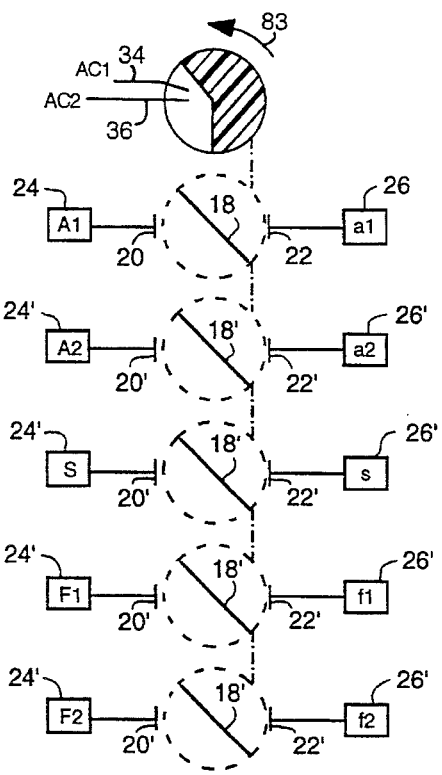
FIG. 7c is a schematic representation of the device wired for a direct current motor.

FIG. 7c is a schematic representation of the device when used on a direct current motor. In this application If the motor is connected with a series field, a total of five motor contacts are used in addition to the auxiliary contacts. The line lugs 24 (and corresponding terminal lugs 26) are used as follows: terminals A1 and A2 are used for the armature connections, terminal S is used for the series field coil, and, terminals F1 and F2 are used for the shunt field. Again, the manner of electrical contact function is identical to that described in FIG. 7a wherein rotation of the tumbler 16 in the direction of arrow 83 closes the auxiliary contacts 34 and 36 first, followed by the completion of the circuits by the contact pins 18 between the respective line terminal members 20 and motor terminal members 22.

Figure 8:
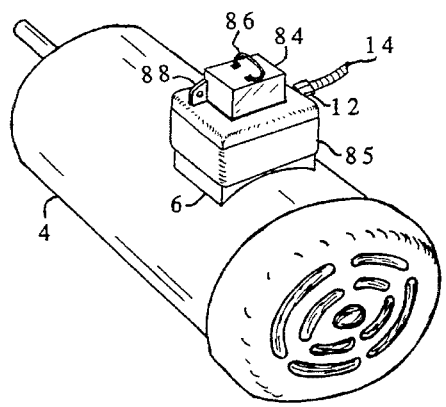
FIG. 8 is a perspective view of a second embodiment mounted on an electric motor.

FIG. 8 is a perspective view of a second embodiment. In similar fashion to the first embodiment, an adaptor plate 6 is used to mate the disconnecting device 85 to the electric motor 4. Additionally, a threaded connector boss 10 (which is shown in FIG. 9) is used to secure the conduit coupling 12 and the attached conduit 14.

As seen from this perspective view, the apparatus has a telescoping draw-out unit 84, which is withdrawn by the use of a bail handle 86 or similar device. A telescoping lock-out tab 88 is affixed to the draw-out unit 84 so that the device may be locked in the de-energized position.

Figure 9:
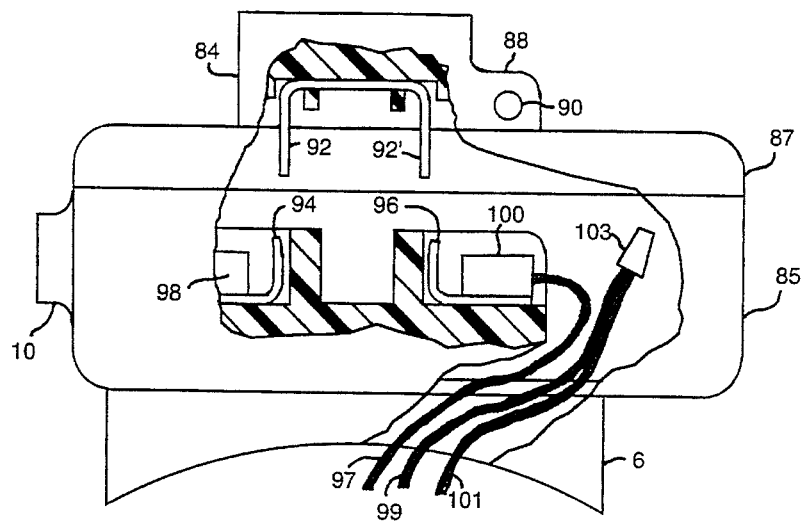
FIG. 9 is an elevation and partial sectional view of a second embodiment.

FIG. 9 better demonstrates the working details of the second embodiment. The telescoping lock-out tab 88 is shown in greater detail as being a molded portion of the draw-out unit 84 which is shown in the extended position. A locking device (such as a padlock) can be attached to the lock-out tab hole 90 to prevent accidental energizing of the motor circuit.

The device consists merely of a movable contact 92 element formed from a single piece of conductive material. In the de-energized position, the movable contact 92 is not in physical contact with other conductive elements of the device. A motor wire lead 97 is shown terminated on a load lug 100. The enclosure provides additional space where motor tap connections may be connected. Motor wire leads 99 and 101 are connected by a wire nut connector 103 in this space.

The device has a top cover 87 secured by appropriate fasteners.

Figure 10:
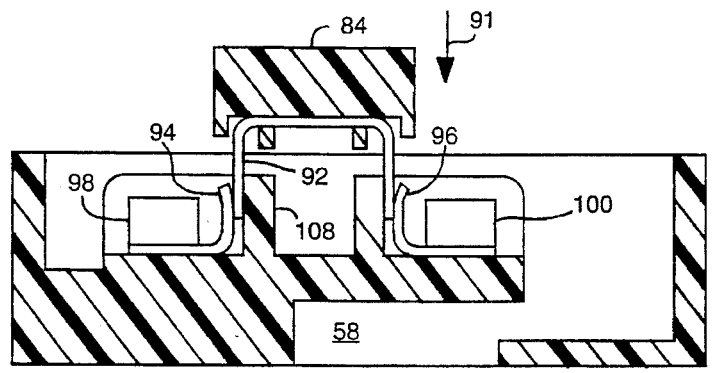
FIG. 10 is a sectional view of a second embodiment.
Figure 12:
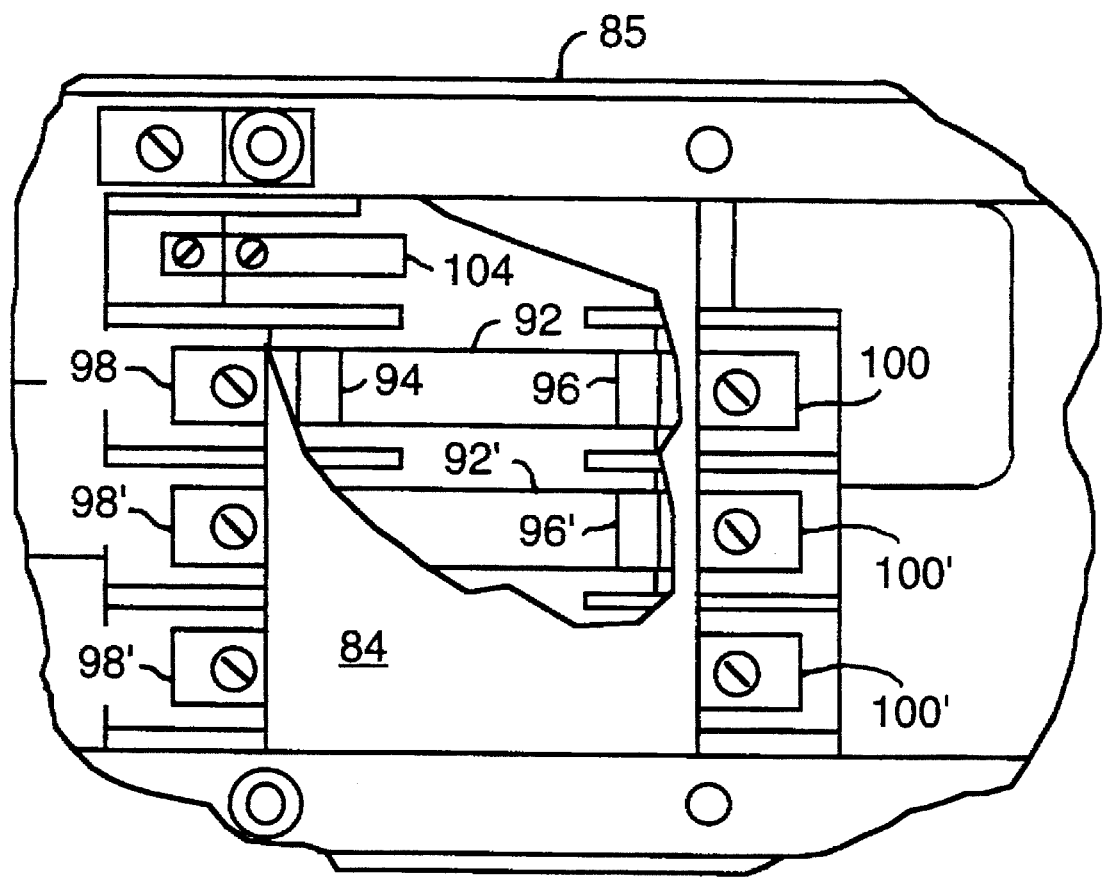
FIG. 12 is a plan view of the contact portion of a second embodiment.

FIG. 10 is a sectional view showing how the device of the second embodiment is positioned in the energized state. The draw-out unit 84 is forced into the energized position as indicated by arrow 91 which causes the movable contact 92 to simultaneously make contact with the line contactor 94 and the load contactor 96 which are in electrical contact with the line lug 98 and load lug 100 respectively.

As shown in the previous embodiment, this device also has a wire channel 58 through which the motor leads are connected to their respective termination points.

Figure 11:
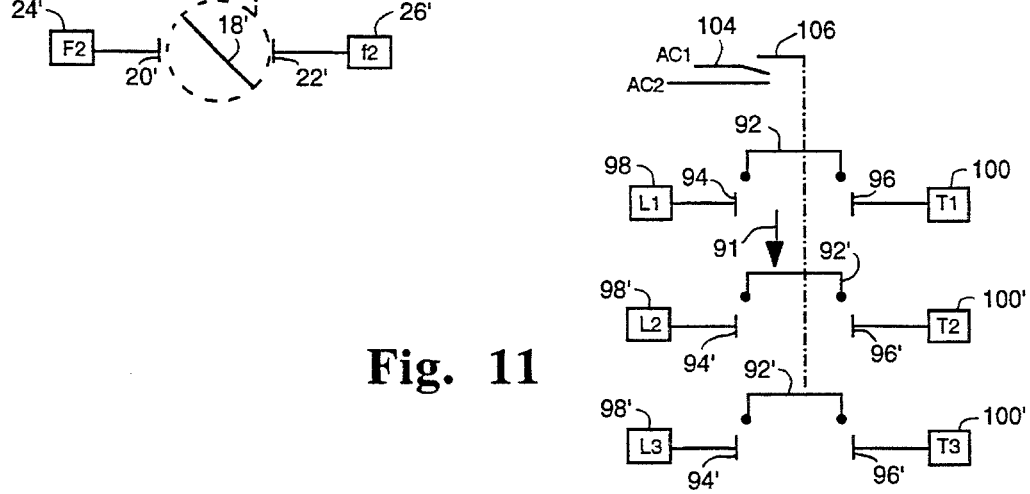
FIG. 11 is a schematic representation of the second embodiment.

FIG. 11 schematically represents the second embodiment. The line lugs 98 (which are conventionally designated as L1, L2, and L3) are in electrical contact with the line contactor 94 whereas the load lugs 100 (which are conventionally designated as T1, T2, and T3) are in electrical contact with the load contactor 96. When the coupled movable contacts 92 are closed (as indicated by arrow 91), the circuit is energized.

Auxiliary contacts 104 may also be used in the second embodiment. In this case, they are mechanically closed by an insulated member 106 of the draw-out unit 84.

OPERATION

In almost all electrical devices in which a current passes across contact points, the device is arranged so that the points close with a wiping action to establish optimum conductivity. It should be noted that in both embodiments, all contacts achieve this action. In the first embodiment, the contact pin 8 is drawn across the face of the line terminal member 20 and the motor terminal member 22 in coming to the rest position, in the second embodiment, the movable contact 92 wipes across line contactor 94 and the load contactor 96 during the contact-make interval.

The auxiliary contacts (34 with 36 and 104) also close with a wiping action caused by either the cam action of the tumbler 16 or the motion of the closing draw-out unit 84. It should also be noted that in all cases where auxiliary contacts are used, the cam portion 38 of the tumbler or the insulated member 106 of the draw-out unit 84 is timed so that the auxiliary contacts open before the main current carrying contacts open, and conversely, close after the main current carrying elements are again in contact. In this way, the main contacts are prevented from carrying the arcing load required in breaking the circuit. (It should be noted, however, that the main contracts are rated such that they can withstand the circuit breaking load at full current conditions.)

Ideally, as noted in the preceding paragraph, the tumbler 16 is manipulated under non-operating conditions when the device is not carrying current. In some cases, however, it may be used to disconnect a motor under load, particularly in the case of emergences. When such is the case, arc suppression is needed between the respective line terminal member 20, contact pin 18, and motor terminal member 22. By providing the tumbler 16 with annular grooves 62 into which a insulating partition projection 64 protrudes, an ionizing chamber 112 is created which suppresses the arc. Additionally, the annular groove 62 in conjunction with the insulating partition projection 64 reduces the occurrence of arcing between poles.

In both embodiments, resilient members are used to enhance the wiping effect. The line terminal member 20 is a resilient conductive material which causes the contact pin 18 to be held in compression and thus causes wiping. In the second embodiment, both the line contactor 94 and the load contactor 96 are resilient conductive elements and tensionably grip the movable contact 92 between themselves and molded body supports 108.

In the first embodiment, the contact pin 18 is further constructed so that it "floats" in the tumbler 16. This action assures that each contact pin 18 is independently free to center between its respective contact surfaces and establish optimum electrical contact.

Various pole combinations are possible in both embodiments. The majority of alternating current applications will be three phase (requiring three poles) or single phase (requiring two poles). For simplicity of manufacture, the most typical alternating current device would be supplied with three poles wherein only two poles would be used for single phase applications.

For direct current applications some units would be required with as many as five poles. In these cases the armature poles (A1 and A2) and the series pole (S) would be capable of carrying higher current values than the shunt field poles (F1 and F2). Further, in direct current applications, additional timing may be provided wherein the armature poles (and the series field pole, when used) break before the shunt field poles. Such a timing sequence is simply achieved by rotationally displacing selected contact pins 18 in the tumbler 16 relative to other contact pins, or, by shortening the reach of selected movable contacts 92 relative to other movable contacts in the same draw-out unit 84.

In some cases, the device may not be equipped with auxiliary contacts. This may be particularly true of the second embodiment used on small motors where the load is light and both physical size and the cost of the unit are major manufacturing considerations.

In operation, the switching function must be provided with a detente or stop action. In the first embodiment, this is primarily achieved with the detente 110 on the line terminal member 20 as shown in FIG. 2a. In the second embodiment, this may be simply achieved by means of the upper and lower limits of travel of the draw-out unit 84. In both cases, additional provisions may be made in the mechanical structure of the tumbler 16 or draw-out unit 84 to provide appropriate position indexing. As shown in FIG. 3, a toggle spring 41 may be used to cause the tumbler 16 to forcibly snap into either the open or closed position. The tumbler spring 41 is biased so that the tumbler 16 resists remaining in the mid-position of its travel. To avoid an abundance of detail in the drawings, appropriate travel limit stops and related details have not been shown. Such provision would, of course, be provided by the manufacturer.

In practice, the respective embodiment would be manufactured to accommodate a range of electric motor requirements. In all likelihood, a unit would be provided with the horsepower range of a commensurate motor magnetic starter. (That is, a size 0 motor starter rated for 480 volts will accommodate an alternating current motor from one horsepower to 5 horsepower. Similarly, a single size motor disconnecting device may be applicable for a 480 volt motor from one to 5 horsepower.) This standardization would reduce manufacturing costs. In all cases, according to NEC requirements, the contacts would be rated for one hundred and fifteen percent of the highest full load current permissible for the unit.

Optimum application of either embodiment of this device would most likely be from the equivalent of a size 00 magnetic motor starter (rated 2 horse power at 460 volts) to size 4½ (rated 150 horse power at 460 volts). It should be borne in mind that the limiting factor to maximum size is found in the economy of manufacturing, not in the design of the device.

It should be further noted that the primary intended application for the various embodiments of this device would be at a maximum of 600 volts. In some cases, a draw-out device may be built with a 250 volt maximum usage; in most cases, however, the 600 volt unit would be permissible on any of the common voltages up to 600 volts.

In actual field use, this device would accommodate a wide range of electric motors. Either delta or wye connected alternating current motors, in addition to direct current motors, may be protected by this device. In many applications, the device is used only to control the incoming power leads and—optionally—an auxiliary contact. Motor taps may be connected in the provided space with appropriate splicing methods and do not require terminals as a part of the device itself.

The ease of adapting a given disconnecting unit to a wide range of motor sizes and types is achieved by the adapter plate 6. This affords the manufacturer a considerable cost savings In supplying a wide range of motors with appropriate disconnecting devices. In some cases, however, the adapter plate 6 may be eliminated by forming the disconnecting device body 52 (or 85) to conform directly to the body of the electric motor 4.

In order to accommodate the needs of a broad market range, two embodiments are offered. The preferred embodiment, which is of higher cost, is generally manufactured to a NEMA 4 (rain-tight) specification and additionally may include motor terminal lugs 28 which are extraneous to the function of the disconnect unit. Whereas, the second embodiment, which is of lower cost, may be constructed as a NEMA 1 enclosure for general purpose use only and includes no additional termination points for motor winding taps. In some applications the second embodiment may not include auxiliary contacts.

The drawings indicate the use of nonmetallic (plastic) materials for the construction of the non-current carrying parts of both embodiments. In practice, this is economically preferable and in keeping with the exception clause of NEC 430-12 (a). Where the construction is of a plastic material, proper grounding provisions, such as the grounding sleeve 66, are required.

NEC 430-104 specifies that "The disconnecting means shall plainly indicate whether it is in the open (off) or closed (on) position." This is achieved by marking and color coding on the hand operator 8 or draw-out unit 84.

The embodiments of the invention in which an exclusive property or privilege is claimed are defined below.

What we claim is:

1. A method of operating within a single enclosure immediately affixed to an electric motor, a terminal housing for field selectable motor tap connections and a power line disconnecting device, said method of operation comprising:

(a) a first step wherein external power supply lines feeding said electric motor are terminated onto two or more incoming line lug members on a power supply side of a disconnecting means, and further, wherein each of said incoming line lug members on said power supply side is electrically conductive with a respective line terminal member;

(b) a second step wherein electrical power connection taps of said electric motor are terminated onto two or more terminal lug members on a load side of said disconnecting means, and further, wherein each of said terminal lug members on said load side is electrically conductive with a respective rigid terminal member;

(c) a third step wherein a mechanically coupled rotary switching device causes to operate in unison two or more conductive members which are electrically isolated from each other, each of said conductive members being interposed between one of said connection terminals on said power supply side and one of said electrically common connection terminals on said load side;

(d) a fourth step wherein said rotary switching device is selectively and manually manipulated to close or open an electrical circuit between any electrically common pair of said electrically isolated connection terminal members on said power supply side with said respective electrically isolated motor terminal members on said load side; and, (e) a fifth step wherein space is provided within said single enclosure to accommodate and terminate on one or more motor terminal lugs said field selectable motor tap wires which are extraneous to the function of said rotary switching device but are requisite to the electrical connection of said electric motor.

2. A method as defined in claim 1 wherein said rotary switching device employs at least two contact pins mounted within a rotary tumbler body; said contact pins having allowable limits of movement which enhance electrical contact between said electrically isolated terminal members on said power supply side and said respective electrically isolated motor terminal members on said load side; said allowable limits of movement being nutate movement of said contact pins within said rotary tumbler body.

3. A method as defined in claim 1 further employing the simultaneous operation of an electrically isolated auxiliary electrical contact switching means whereby a low power switching circuit is controlled concurrently with said conductive members being interposed between one of said connection terminals on said power supply side and one of said electrically common connection terminals on said load side; said electrically isolated auxiliary electric contact switching means being an integral mechanism within said rotary tumbler body.

4. A method as defined in claim 1 further incorporating a mechanical toggle function with which said rotary tumbler body is forcibly located into either extreme of said rotary tumbler body's travel, said toggle function actuated by an elastomeric member mounted in compression between said rotary tumbler body and an enclosure body, and further wherein said elastomeric member constrains said rotary tumbler body into either extreme of said rotary tumbler body's travel.

5. A method as defined in claim 1 further employing within said rotary switching device an arc chamber wherein an electrical arc initiated by opening said conductive member's being interposed between one of said connection terminals on said power supply side and one of said electrically common connection terminals on said load side is extinguished through a tortuous air path defined by said arc chamber consisting of at least two annular grooves within said rotary tumbler body into which project at least two insulating partitions from said enclosure body.

6. A method as defined in claim 1 further employing a grounding conductor in a non-conductive housing body by incorporating a metallic grounding sleeve cooperating with a ground lug and a conductive fastener between said housing body and a conductive adapter plate mounting device in contact with the motor ground; said conductive fastener cojoining and in electrical contact with said ground lug and said adapter plate mounting device.

7. A method as defined in claim 1 further employing a cam action which causes said rotary tumbler body to rotate forcibly to either extreme of its permitted rotational travel to operate an electrically isolated auxiliary contact.

8. A method as defined in claim 1 further employing a locking means provided on the exterior portion of said rotary tumbler body which restrains said rotary tumbler body with a mechanical locking device in cooperation with said housing body in such a position at one extreme limit of rotation of said rotary tumbler body wherein said conductive members within said rotary tumbler body are electrically open.

9. A method as defined in claim 1 further employing an adapter plate with an upper adapter plate mounting surface conformable to a lower housing mounting surface, and further providing said adapter plate with a lower adapter plate mounting surface conformable to said electric motor; whereby a multiplicity of said adapter plates mate said single enclosure to a multiplicity of motor case configurations.

10. A method as defined in claim 1 further employing said single enclosure including said terminal housing for motor tap connections and said power line disconnecting device with an alternating electric current motor.

11. A method as defined in claim 1 further employing said single enclosure including said terminal housing for motor tap connections and said power line disconnecting device with a direct electric current motor.

12. A method as defined in claim 1 further employing said single enclosure including said terminal housing for motor tap connections and said power line disconnecting device with motor terminal lugs wherein said motor tap wires extraneous to said load side electrical connections may be terminated onto said motor terminal lugs.

13. A method of operating within a single enclosure immediately affixed to an electric motor, a terminal housing for field selectable motor tap connections and a power line disconnecting device, said method of operation comprising:

(a) a first step wherein said external power supply lines feeding said electric motor are terminated onto two or more incoming line lug members on a power supply side of a disconnecting means, and further, wherein each of said incoming line lug members on said power supply side is electrically conductive with a respective line contactor member;

(b) a second step wherein electrical power connection taps of said electric motor are terminated onto two or more load lug members on a load side of said disconnecting means, and further, wherein each of said load lug members on said load side is electrically conductive with a respective load contactor member;

(c) a third step wherein a draw-out switching device causes to operate in unison two or more movable contact members which are electrically isolated from each other, each of said movable contact members being mechanically coupled to a common insulated draw-out switching body, and further, wherein each of said movable contact members are interposed between one of said incoming line lug members on said power supply side and one of said load contactor members on said load side;

(d) a fourth step wherein said draw-out switching device is selectively and manually manipulated causing at least one movable contact within said draw-out switching device to close or open the electrical circuit between any electrically common pair of said line contactor members on said power supply side with said respective load contactor member on said load side; and, (e) a fifth step wherein space is provided within said single enclosure to accommodate and terminate said field selectable motor tap wires which are extraneous to the function of said draw-out switching device but are requisite to the electrical connection of said electric motor.

14. A method as defined in claim 13 wherein said draw-out switching body contains at least two formed movable contact elements; said formed movable contact elements being fixedly mounted to said draw-out switching body making electrical contact in the closed position between said line contactor members on said power supply side with said respective load contactor members on said load side by bridging the opening between said line contactor and said load contactor.

15. A method as defined in claim 13 further employing the simultaneous operation of an auxiliary contact switching means which is of a bridging nature, mechanically coupled with, and rigidly affixed to, said draw-out switching body whereby said auxiliary contact switching circuit is simultaneously controlled with said line contactor members when said draw-out switching body is manipulated.

16. A method as defined in claim 13 further employing a grounding conductor in a non-conductive housing body by incorporating a metallic grounding sleeve cooperating with a ground lug and a conductive fastener between said housing body and a conductive mounting device in contact with the motor ground.

17. A method as defined in claim 13 further employing a padlock locking means provided on the exterior portion of said draw-out device body which restrains said draw-out device body in such a position at the extreme limit of extension of said draw-out device wherein said conductive members within said draw-out device body are electrically open.

18. A method as defined in claim 13 further employing an adapter plate with an upper adapter plate mounting surface conformable to a lower housing mounting surface, and further providing said adapter plate with a lower adapter plate mounting surface conformable to said electric motor; whereby a multiplicity of said adapter plates mate said single enclosure to a multiplicity of motor case configurations.

19. A method as defined in claim 13 further employing said single enclosure including said terminal housing for motor tap connections and said power line disconnecting device with an alternating electric current motor.

20. A method as defined in claim 13 further employing said single enclosure including said terminal housing for motor tap connections and said power line disconnecting device with a direct electric current motor.

21. A method as defined in claim 13 further employing said single enclosure including said terminal housing for motor tap connections and said power line disconnecting device with motor load lugs wherein said motor tap wires extraneous to said load side electrical connections may be terminated onto said motor load lugs.

* * * * *